United States Patent [19]

Kawazoe

[11] 4,234,149
[45] Nov. 18, 1980

[54] TILTING ADJUSTING MECHANISM FOR A CAMERA TRIPOD

[76] Inventor: Michio Kawazoe, 30-11, 5 chome, Higashi Narita Suginami ku, Tokyo, Japan

[21] Appl. No.: 902,914

[22] Filed: May 5, 1978

[30] Foreign Application Priority Data

Dec. 2, 1977 [JP] Japan ................................ 52-162484

[51] Int. Cl.² ............................................. F16M 13/00
[52] U.S. Cl. ................................................. 248/184
[58] Field of Search ................................. 248/183, 184

[56] References Cited
U.S. PATENT DOCUMENTS

| | | | |
|---|---|---|---|
| 1,854,951 | 4/1932 | Neuwirth | 248/183 |
| 2,143,606 | 1/1939 | Mooney | 248/183 |
| 2,318,633 | 5/1943 | Ries | 248/183 |
| 2,550,415 | 4/1951 | Kammermeyer | 248/183 |
| 2,827,813 | 3/1958 | Totten | 151/21 C X |
| 2,962,251 | 11/1960 | Karpf | 248/183 |
| 3,128,982 | 4/1964 | Christopher | 248/183 |

*Primary Examiner*—William H. Schultz
*Attorney, Agent, or Firm*—Donald D. Mon

[57] ABSTRACT

A tilting adjusting mechanism for a camera tripod makes it possible to change the direction of the operating handle either toward the right or toward the left according to whether the operator is a left handed person or a right handed person, thus permitting operation by the more skillful hand of both a right handed person and a left handed person.

2 Claims, 4 Drawing Figures

TILTING ADJUSTING MECHANISM FOR A CAMERA TRIPOD

BACKGROUND OF THE INVENTION

The present invention relates to a tilting adjusting mechanism for a camera tripod, and more particularly to a tilting adjusting mechanism for a camera tripod which makes it possible to connect the operating handle so as to extend in a direction either toward the right or toward the left.

Hitherto, in a conventional tripod, the handle for adjusting tilting has extended from tilting adjusting mechanism in one direction only (see handle 13 of FIG. 1). Therefore, if tripod and camera set for a right handed person so as to extend the handle in a direction toward the right for ease of operation, is used by a left handed person, the left handed person would suffer the inconvenience of having to use unskilled hand ie the right hand. Alternatively, the left handed person would have to change the position of tripod relative to the camera by 180 degrees and begin the adjusting operation ab initio. This changing operation of the location of tripod and camera and readjusting operation is furthermore an inconvenient operation. The same thing also occurs when a tripod and camera set for a left handed person is used by a right handed person.

BRIEF SUMMARY OF THE INVENTION

Therefore, it is an object of the invention to provide a tilting adjustion mechanism for a camera tripod which makes it possible to connect the handle for operation the tilting adjusting so that the handle extends either toward the right or toward the left.

Other objects and advantages of the invention will be apparent from the following explanation of the accompanying drawings.

BRIEF DESCRIPTION OF THE DRAWING

In the drawing;

FIG. 1 shows an example of a conventional tripod, wherein 1 represents its three legs, 2 is an elevator shaft, 3 is a handle for operating said elevator shaft up and down, 4 is a handle for fixing said elevator shaft a desired position, 5 is a rotating part which rotates about a vertical shaft 6 in a horizontal plane and the vertical shaft 6 is fixed on the top face of said elevator shaft 2 by a screw, 7 is a tilting part tiltable toward the right or left which is pivoted on said rotating part 5 about a horizontal shaft 8 extending from front to rear, 12 is a handle for fixing the rotating part 5 to vertical shaft 6, 13 is a handle provided on said tilting part 7 for rotating in a horizontal plane and tilting right or left and the threaded shaft (not shown) of the handle 13 extends through the split 15 of the tilting part 7 for fixing the part 7 to said horizontal shaft 8 upon the rotation of handle 13, 10 is a securing plate for a camera 16 and is rotatable up and down about a horizontal shaft 9 extending from right to left on said tilting part 7, 14 is a handle for securing the plate 10 to tilting part 7, 17 is a screw adapted on a camera fixing screw 11 through a thread for fixing camera 16 to securing plate 10.

Figure 1:
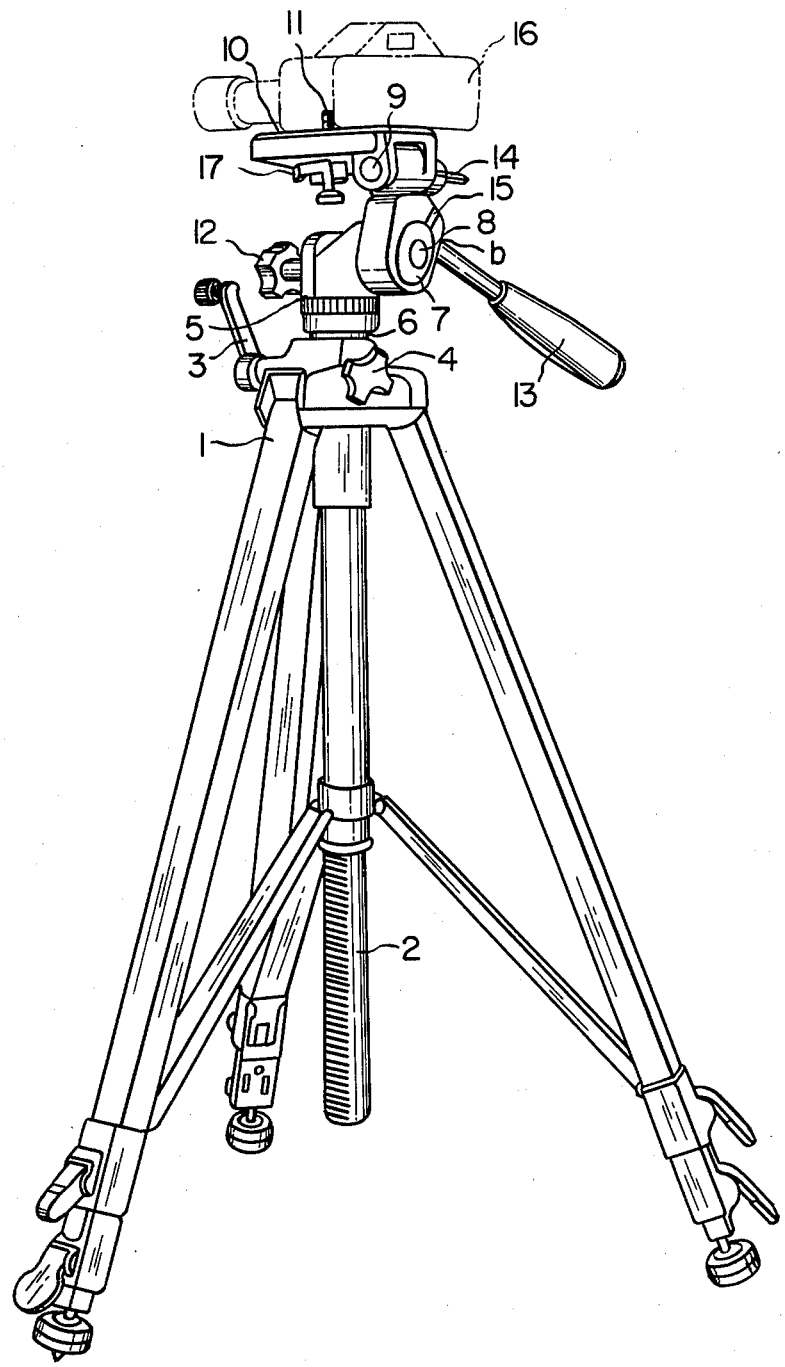
FIG. 1 is an elevation view of a tripod which has been previously used.

In this device, for adjusting the camera fixed on plate 10, rotating part 5 can be rotated within 360 degree about vertical shaft 6 by handle 13 when the threads of handles 12 and 13 are loosened, and plate 10 can be rotated up and down about horizontal shaft 9 when the thread of handle 14 is loosened. Therefore, the direction or tilting of camera 16 can be adjusted a desired direction or tilting and fixed the desired direction or tilting by securing the threads of handles 12,13,14.

However, in said conventional tripod, as shown in FIG. 1, the split 15 for securing and releasing between tilting part 7 and horizontal shaft 8, and handle 13 having screw thread at its end and extending through the split 15 are provided at the one side of horizontal shaft 8, ie right side or left side. For example, in FIG. 1, handle 13 extends in the right direction because split 15 exists at the right side and handle 13 should extend through the split 15. However this construction is convenient for a right handed person only. When it is used by a left handed person, the left handed person has to use his unpracticed hand ie the right hand for adjusting. Alternatively he has to change the relation between the camera and tripod by 180 degrees and begin the adjusting operation from the start, and viceversa.

Figure 2:
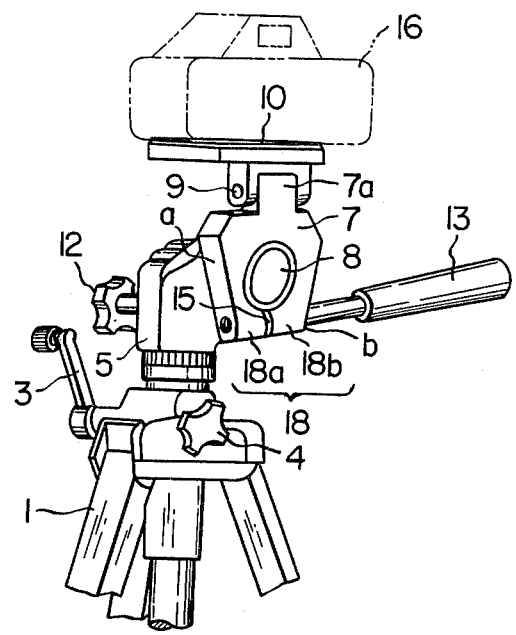
FIG. 2 is an elevation view of the upper part of a tripod according to present invention.
Figure 3:
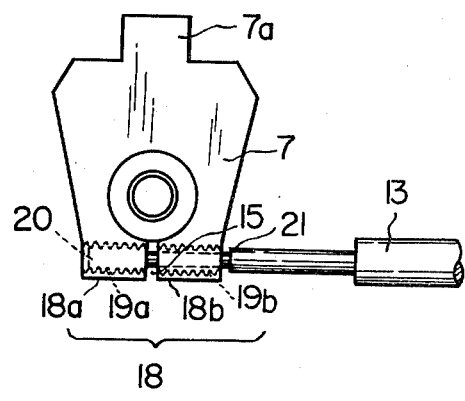
FIG. 3 and 4 are explanatory view of a tilting mechanism according to present invention.
Figure 4:
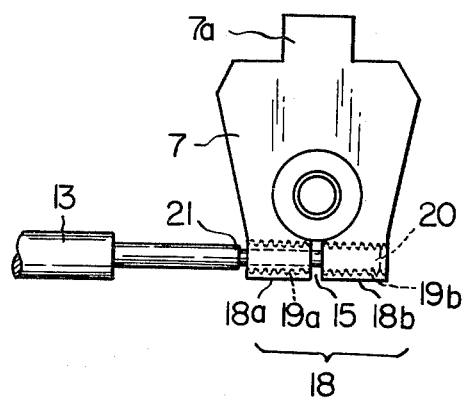

The present invention is intended to eliminate said drawbacks, and one embodiment of the present invention is shown in FIGS. 2,3,4, in which the same numerals identify the same part as in FIG. 1.

The present invention, split 15 is provided at the end 18 which is opposite the end 7a to be connected to plate 10. These opposite sides parts 18a, 18b of the split 15 have female threaded holes 19a, 19b respectively, which have the same pitch and same direction and are adapted to a male thread 20 which is provided at the end of handle 13. The male thread 20 of handle 13 has a larger diameter than that of the handle shaft and the length of the male thread 20 corresponds to one of threaded holes 19a or 19b. Therefore the male thread 20 engages with either female threaded hole 19a or 19b. The shaft of handle 13 has an expansion part 21 which has larger diameter than said female threaded hole 19a or 19b, and contacts with side face of said side part 18a or 18b.

The operation of this device is as follows; When a right handed person uses this device, camera 16 is fixed on plate 10 as shown FIG. 2, and handle 13 is connected to tilting part 7 so as to extend in the right direction as shown in FIG. 2 and 3. In this case, the handle 13 passes through female threaded hole 19b and its male thread 20 engages female threaded hole 19a. When a left handed person uses this device, handle 13 is connected to tilting part 7 so as to extend in the left direction as shown in FIG. 4. In this case, the handle 13 passes through female threaded hole 19a and its male thread 20 engages female thread hole 19b. Therefore it is possible to perform the tilting adjusting by the hand which is more skillful than the other for the both of right handed person and left handed person. In changing from a right handed person to a left handed person, the left handed person removes handle 13 which extends to the right, and attaches the handle 13 to tilting part 7 so as to extend to the left.

What is claimed is:

1. In a camera tilting adjusting mechanism for a tripod having a vertical elevator shaft and having a rotatable member rotatable on a first horizontal shaft attached to said rotatable member and extending in the forward and rearward direction, and a camera-securing plate rotatable on a second horizontal shaft attached to tiltable member and extending in the left and right direction, the improvement wherein:

said tiltable member contains a bifurcation separating two adjacent portions of the tiltable member;

a hole passing through each of said adjacent portions, said holes being of the same diameter and aligned with each other and having threads of the same pitch and direction a reversible handle member protruding from the tiltable member, said handle member having a first section threadable to the threads of said holes, a second section of a diameter larger than the diameter of said holes and a third section of a smaller diameter than said holes providing a clearance for said threads and located between the first and second sections so that a shoulder is formed at the junction of said first and third sections;

whereby said shoulder is adapted to abut either of said adjacent portions of the tiltable member when said first section is threaded into the hole remote from the shoulder.

2. Mechanism according to claim 1 in which said two adjacent portions of the tiltable member are beneath said first horizontal shaft.

* * * * *